United States Patent [19]

Kawada et al.

[11] Patent Number: 4,661,736
[45] Date of Patent: Apr. 28, 1987

[54] ROTOR FOR A SYNCHRONOUS MOTOR

[75] Inventors: Shigeki Kawada; Yoichi Amemiya; Masatoyo Sogabe, all of Hachioji; Noboru Iwamatsu, Hino, all of Japan

[73] Assignee: Fanuc Ltd, Yamanashi, Japan

[21] Appl. No.: 767,586

[22] PCT Filed: Dec. 5, 1984

[86] PCT No.: PCT/JP84/00574
§ 371 Date: Jul. 30, 1985
§ 102(e) Date: Jul. 30, 1985

[87] PCT Pub. No.: WO85/02726
PCT Pub. Date: Jun. 20, 1985

[30] Foreign Application Priority Data

Dec. 5, 1983 [JP] Japan ................. 58-228362

[51] Int. Cl.$^4$ ........................... H02K 21/12
[52] U.S. Cl. ................... 310/156; 310/156; 310/269
[58] Field of Search ............. 310/162, 156, 263, 269, 310/49

[56] References Cited

U.S. PATENT DOCUMENTS 3,696,260 10/1972 Lace ..................... 310/156
4,406,958 9/1983 Palmero et al. ............ 310/156 X

FOREIGN PATENT DOCUMENTS 50-67304 6/1975 Japan.
58-12355 7/1983 Japan.

OTHER PUBLICATIONS

International Search Report.

Primary Examiner—Donovan F. Duggan
Attorney, Agent, or Firm—Armstrong, Nikaido, Marmelstein & Kubovcik

[57] ABSTRACT

A rotor for a synchronous motor, having a plurality of first magnetic poles (19) formed by a plurality of permanent magnets respectively and disposed at practically equal circumferential intervals on the outer circumference of a yoke (18) fixed to a rotatable motor shaft (14), and a second magnetic pole (18a) projecting radially from the yoke (18) adjacently to each first magnetic pole (19) so as to form a pair of a first magnetic pole (19) and the second magnetic pole (18a), wherein the shape of the pole face of each second magnetic pole (18a) is decided so that the magnetic flux distribution established by a pair of the first magnetic pole (19) and the second magnetic pole (18a) is practically equivalent to a sinusoidal magnetic flux distribution in the sweeping effect by the armature coils of each phase of the stator (11).

4 Claims, 5 Drawing Figures

ROTOR FOR A SYNCHRONOUS MOTOR

TECHNICAL FIELD

The present invention relates to a rotor for a synchronous motor.

BACKGROUND ART

Among synchronous motors, a salient-pole synchronous motor having a rotor including permanent magnets as salient poles and disposed rotatably inside a stator having excitation coils of a plurality of phases for producing a revolving magnetic field is well known. In such a salient-pole synchronous motor, it is necessary that the field magnetic flux distribution due to the salient poles of the rotor, which interacts with the stator having an armature flux distribution of a sinusoidal waveform, be a sinusoidal waveform. One of the measures taken to set up such a magnetic field distribution of sinusoidal waveforms requires that the form of the pole face of each magnetic pole be decided so that $$G_l = G_{min}/\cos\theta \quad (1)$$

where $G_l$ is the gap length between the inner surface of the stator and the pole face of each magnetic pole of the rotor, $G_{min}$ is the minimum gap length along the axis of the magnetic pole, and $\theta$ is an angle to the right or to the left from the axis of the magnetic pole.

As illustrated in FIG. 1A, when the magnetic poles of a salient-pole synchronous motor are constituted only by permanent magnets, a rotor 2 rotatably disposed inside a stator 1 needs only permanent magnets 6 attached in the form of salient poles to the outer circumference of a spider 5 attached to a motor shaft 4, and hence the rotor 2 can be easily assembled. However, forming the permanent magnet 6, in general, is difficult, and forming a salient pole having a pole face 3 of the shape capable of establishing a magnetic flux distribution of a sinusoidal waveform is very difficult.

Accordingly, as illustrated in FIG. 1B, a widely employed rotor has a construction in which the projecting end face of a permanent magnet 6a is formed in a flat plane or in a plane of a circular arc, which can be easily formed, and a yoke piece 7 having a surface of a form capable of establishing the above-mentioned magnetic flux distribution of a sinusoidal waveform is attached to the projecting end face of the permanent magnet 6a. Since the yoke piece can be easily formed, this construction is capable of establishing a magnetic flux distribution of a sinusoidal waveform. However, this construction is complicated when assembled, reduces the mechanical accuracy and strength of the rotor, and requires an increased manufacturing cost.

DISCLOSURE OF THE INVENTION

Accordingly it is an object of the present invention to provide a rotor for a synchronous motor, capable of simplifying the processes of manufacturing and assembling the same and of rotating smoothly.

The present invention provides a rotor for a synchronous motor, rotatably supported inside a cylindrical stator provided with armature coils having a plurality of phases, comprising: a motor shaft; yoke means fixed to the motor shaft; a plurality of first magnetic poles formed by a plurality of permanent magnets fixedly disposed on the circumference of the yoke means at practically equal circumferential intervals; a plurality of second magnetic poles each projecting radially from the yoke means and disposed between the adjacent first magnetic poles; and a magnetic pole configuration in which the shape of the pole face of the second magnetic pole is decided dependent on the fixed form of the pole face of the adjacent first magnetic pole so that the distribution of the field magnetic flux set up by a pair of the adjacent first magnetic pole and the second magnetic pole is practically equivalent to a sinusoidal magnetic flux distribution in respect of the sweeping effect by the armature coil of each phase.

As mentioned above, in a salient-pole synchronous motor, it is necessary that the field magnetic flux distribution is a sinusoidal distribution in order to ensure smooth movement of the rotor, which means that the magnetic flux swept by the armature coil of the stator as the rotor rotates varies sinusoidally. Accordingly, when it is intended to obtain such an effect by a pair of the magnetic poles, the magnetic flux distribution of each of the paired magnetic poles need not necessarily be sinusoidal. As understood from the description above, in the rotor according to the present invention, one of the paired magnetic poles is formed by only a permanent magnet and the other is formed by only the yoke. The pole face of the magnetic pole formed by the yoke is decided so that the magnetic flux distribution set up by both the magnetic pole formed by a permanent magnet and the magnetic pole formed by the yoke is practically equivalent to a sinusoidal magnetic flux distribution in respect of the sweeping effect by the armature coil of each phase of the stator. Accordingly, the shape of the pole face of the magnetic pole formed by a permanent magnet need not be capable of establishing a sinusoidal magnetic flux distribution, and hence the form of the pole face of the same may be, for example, a shape having an axial section of a circular arc, which can be easily formed. Consequently, the machining accuracy and the strength of the permanent magnet are improved. On the other hand, since the machining of the pole surface of the yoke can be easily carried out, a rotor capable of moving smoothly can be manufactured without any difficulty regarding the machining of the parts. Furthermore, since a yoke need not be attached to the surface of the permanent magnet, the rotor has a simple construction and high strength and facilitates assembling.

BEST MODE FOR CARRYING OUT THE INVENTION

Figure 1A:
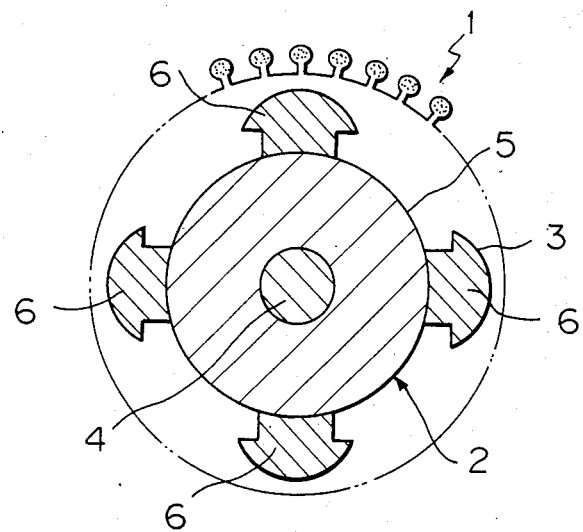
FIGS. 1A and 1B are schematic sectional views, respectively, illustrating, by way of example, the construction of conventional rotors for a salient-pole synchronous motor.
Figure 1B:
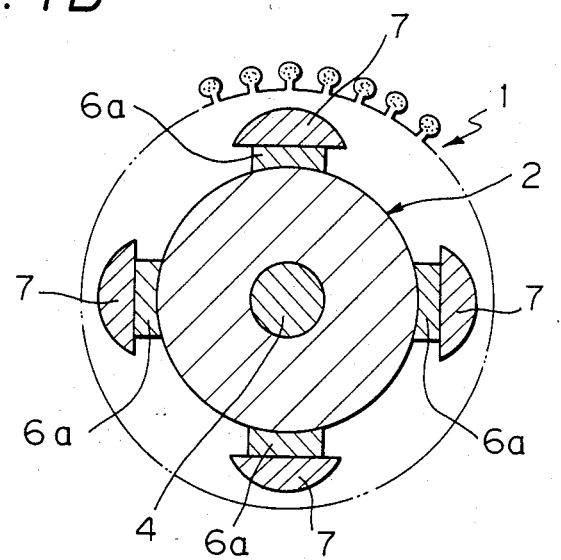
Figure 2:
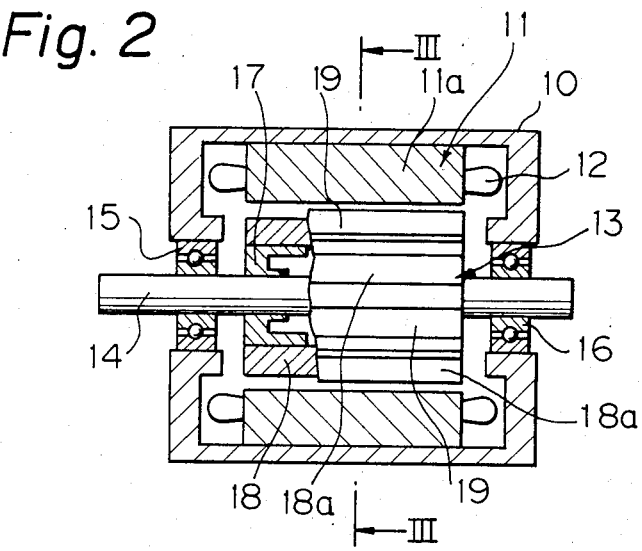
FIG. 2 is a schematic longitudinal sectional view of a synchronous motor and its rotor, in a preferred embodiment according to the present invention.
Figure 3:
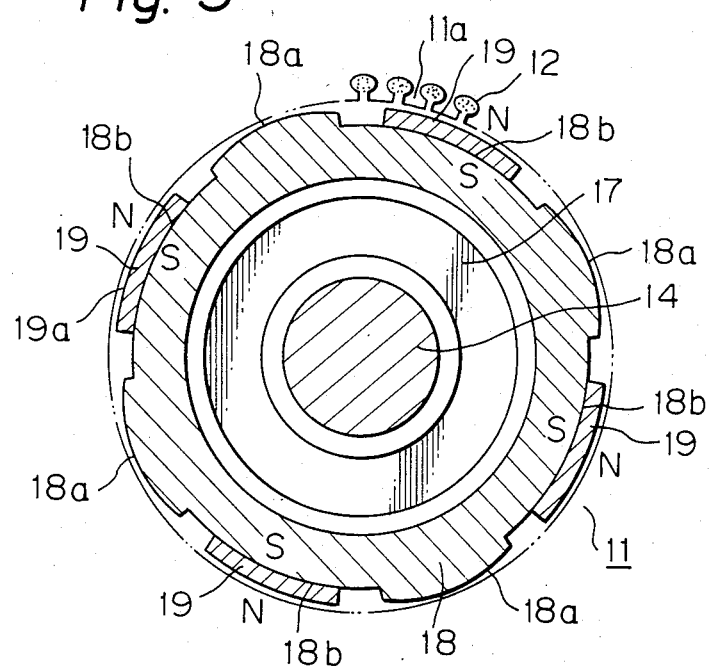
FIG. 3 is a sectional view of the synchronous motor of FIG. 2 taken along the line III—III of FIG. 2.

Referring to FIGS. 2 and 3, a synchronous motor has a stator 11 fixed to a housing 10 and armature coils 12 of a plurality of phases for producing a revolving magnetic field are disposed within slots arranged along the inner circumference of the core 11a. A rotor 13 having a motor shaft 14 is disposed inside the stator 11. The motor shaft 14 is supported rotatably on the housing 10 by bearings 15 and 16.

A nonmagnetic supporting member or a spider 17 is fixed to the motor shaft 14 of the rotor 13. A practically cylindrical yoke 18 is attached to the supporting member 17. A plurality of permanent magnets, four permanent magnets in this embodiment, are disposed on the outer circumference of the yoke 18 at practically equal circumferential intervals to form a plurality of first magnetic poles 19 protruded radially of the yoke 18 to produce magnetic fields. Portions of the outer circumference of the yoke 18 project so as to form second magnetic poles 18a between the adjacent first magnetic poles 19. The adjacent first magnetic pole and the second magnetic pole form a pair of magnetic poles which interact with the stator 11 to produce a torque. In this embodiment, four second magnetic poles 18a are provided corresponding to four first magnetic poles 19 and each pair of magnetic poles form a N-pole and a S-pole respectively to constitute an 8-pole synchronous motor.

The inner surface of the first magnetic pole 19 formed by a permanent magnet is a concave surface of a circular arc fitting the outer circumference 18b of a true circular arc of the yoke 18. A gap of a uniform gap length is formed along the circumferential direction between the pole face 19a of the first magnetic pole 19 (FIG. 3) and the inner surface of the stator 11. The permanent magnet forming the first magnetic pole 19 can be easily fixed adhesively or by suitable means to the outer circumference 18b of a true circular arc of the yoke 18. The permanent magnet of this form can be comparatively easily machined, however, the pole face of the shape, namely, the shape of an arc of a circle, of the first magnetic pole formed by a permanent magnet is unable to establish a sinusoidal magnetic flux distribution. Therefore, the shape of the pole face of the second magnetic pole 18a is decided so that the combined magnetic flux distribution of the paired first magnetic pole 19 and the second magnetic pole 18a of the yoke is equivalent to a sinusoidal magnetic flux distribution. The paired second magnetic pole 18a having a pole face of the shape thus decided and the first magnetic pole 19 effectively makes the amount of the magnetic flux swept by the armature coil 12 of each phase of the stator equivalent to the amount of sinusoidal magnetic flux swept by the same. Consequently, the rotor 13 produces a uniform torque and hence the rotor 11 is able to rotate smoothly.

A method for deciding the shape of the pole face of the second magnetic pole 18a projecting from the yoke 18 will be described hereinafter with reference to FIG. 4.

Figure 4:
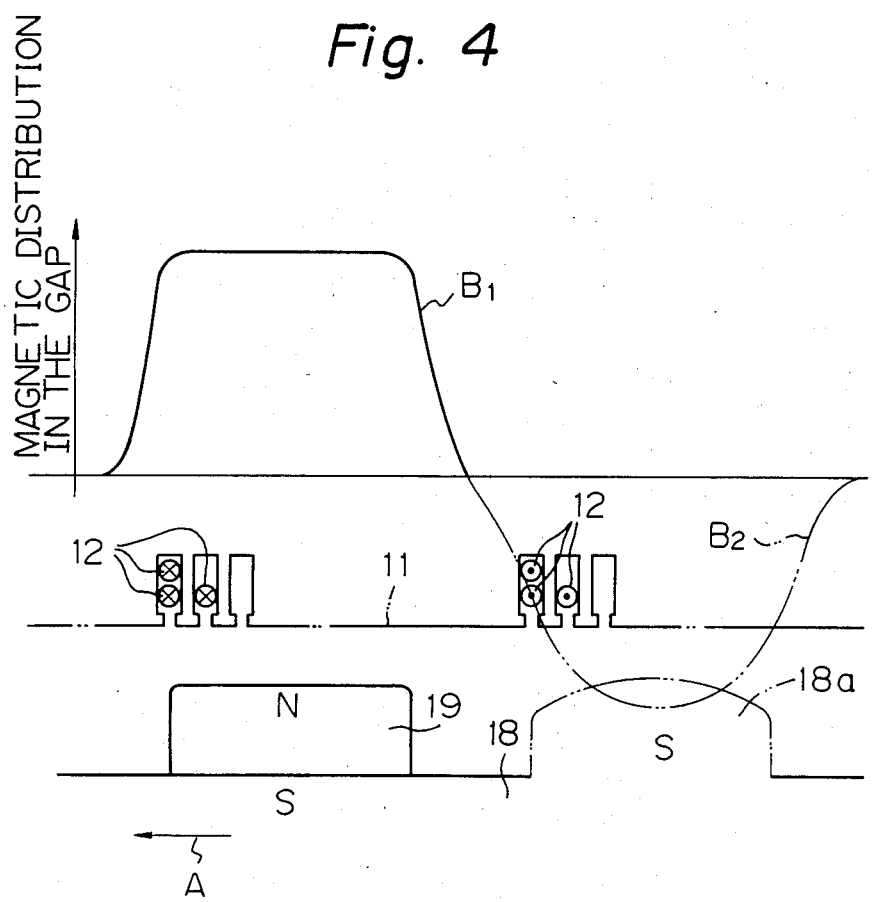
FIG. 4 is a diagram for explaining a method for deciding the form of the pole face of the second magnetic pole of a rotor.

FIG. 4 is a typical illustration showing a pair of the first magnetic pole 19 and the second magnetic pole 18a as located opposite to the armature coil 12 of one phase with a gap therebetween, in a developed view, and the magnetic flux distribution in the gap in a diagram. As described with reference to FIG. 3, the shape of the pole face of the first magnetic pole 19 is a fixed shape forming a gap of a fixed gap length between the inner surface of the stator 11 and the pole face of the first magnetic pole 19. On the other hand, the shape of the pole face of the second magnetic pole 18a to be decided selectively is indicated in an imaginary form by a broken line. It is possible to calculate the magnetic pole 19 having a pole face of a fixed shape without difficulty through experimental arithmetic operation, and the magnetic flux distribution is, for example, a known magnetic flux distribution $B_1$ of a practically trapezoidal form as shown in FIG. 4. Furthermore, it is supposed that the second magnetic pole 18a having the above-mentioned imaginary pole face produces an imaginary magnetic flux distribution $B_2$. In the armature coil 12 of a phase shown in FIG. 4, symbol X indicates that an armature current flows from this side toward the other side of the sheet, while symbol·indicates that the armature current flows from the other side toward this side of the sheet.

In this configuration, when the first magnetic pole 19 and the second magnetic pole 18a moves relative to the stator 11 in a direction indicated by an arrow A, the armature coil 12 sweeps the magnetic fluxes $B_1$ and $B_2$. The imaginary magnetic flux $B_2$ is proper if the total of the effect of sweeping the known magnetic flux $B_1$ and the effect of sweeping the imaginary magnetic flux $B_2$ by the armature coil 12 is equivalent to the effect of sweeping a magnetic flux of an ideal sinusoidal distribution by the armature coil 12. Therefore, the distribution of the imaginary magnetic flux $B_2$, taking into consideration the arrangement and the constitution of the armature coil 12, is decided uniquely. Accordingly, the shape of the pole face of the second magnetic pole 18a can be decided through the reverse operation of the magnetic field on the basis of the thus-decided magnetic flux $B_2$ by means of a computer. It is desirable to ensure that a necessary magnetic flux distribution is obtained by operating the magnetic field to calculate the actual distribution of the magnetic flux $B_2$, after deciding the shape of the pole face of the magnetic pole.

The dimension of the gap between the pole face of the second magnetic pole 18a and the inner surface of the stator 11 is decided dependent on the decision of the shape of the pole face of the second magnetic pole 18a. To enable the rotor 13 to rotate smoothly, it is desirable to make a correction, such as rounding the edges of the surface of the second magnetic pole 18a, to reduce the torque produced by the reluctance change.

Although the invention has been described hereinbefore with reference to a preferred embodiment thereof, the present invention is not limited to this embodiment, but various modifications thereof are possible. For example, first magnetic poles formed by permanent magnets each having opposite flat surfaces may be disposed between the adjacent second magnetic poles formed by the yoke. Furthermore, two permanent magnets each having opposite plat surfaces may be disposed in a triangular form between the adjacent second magnetic poles 18a of the yoke 18 to form one magnetic pole 19 of permanent magnets. Such a flat permanent magnet is easier to form than the permanent magnets employed in the embodiment shown in the drawings. On the other hand, even if permanent magnets each having opposite flat surfaces are employed, the rotational characteristics of the rotor are the same as those of the embodiment, when the shape of the pole face of the magnetic pole of the yoke is decided appropriately, taking into consideration the distribution of the magnetic flux of the permanent magnets. Thus the present invention eliminates the fluctuation of the torque of the rotor, enables the rotor to rotate smoothly, facilitates the machining and assembling of the parts, and provides a rotor having a high machining accuracy and high strength, which improves the performance of the synchronous motor.

We claim:

1. A rotor for a synchronous motor, rotatably supported inside a cylindrical stator provided with armature coils having a plurality of phases, comprising: a motor shaft; yoke means fixed to said motor shaft; a plurality of first magnetic poles formed by a plurality of permanent magnets fixedly disposed on a circumference of said yoke means at substantially equal circumferential intervals; and a plurality of second magnetic poles each projecting radially from said yoke means and disposed between adjacent said first magnetic poles; the pole faces of the poles of said first magnetic poles being in a circular arc in a plane perpendicular to the axis of said motor shaft and the pole faces of each of the poles of said second magnetic poles being in a true circle in said plane perpendicular to said axis of said motor shaft, said circular arc of each of said first magnetic poles having a radius smaller than the radius of said true circle of said second magnetic poles.

2. A rotor for a synchronous motor, according to claim 1, wherein said yoke means comprises a hollow cylindrical member formed of a magnetic material and said second magnetic poles are formed integrally with said yoke means so as to project from an outer circumference of said hollow cylindrical member.

3. A synchronous motor comprising a motor housing, a cylindrical stator attached to said motor housing and provided with armature coils of a plurality of phases, and a rotor rotatably supported inside said stator by bearings with a gap therebetween, said rotor comprising: a motor shaft, a substantially cylindrical yoke fixed through supporting means to said motor shaft, a plurality of first magnetic poles formed by a plurality of permanent magnets respectively and fixedly disposed on an outer circumference of said yoke at substantially equal circumferencial intervals, a plurality of second magnetic poles projecting radially from said yoke and disposed between adjacent said first magnetic poles, the pole faces of the poles of said first magnetic poles being in a circular arc in a plane perpendicular to the axis of said motor shaft and the pole faces of each of the poles of said second magnetic poles being in a true circle in said plane perpendicular to said axis of said motor shaft, said circular arc of each of said first magnetic poles having a radius smaller than the radius of said true circle of said second magnetic poles.

4. A synchronous motor according to claim 3, wherein said rotor has four first magnetic poles and four second magnetic poles.

* * * * *